United States Patent [19]
Kozakai et al.

[11] 3,910,640
[45] Oct. 7, 1975

[54] HYDRAULIC BRAKING SYSTEM

[75] Inventors: Asao Kozakai, Okazaki; Masakazu Ishikawa, Toyota; Takaaki Ota, Okazaki; Sadayoshi Ito, Toyota, all of Japan

[73] Assignees: Aisin Seiki Kabushiki Kaisha; Toyota Jidosha Kogyo Kabushiki Kaisha, Japan

[22] Filed: Jan. 17, 1974

[21] Appl. No.: 434,190

[30] Foreign Application Priority Data
Jan. 31, 1973  Japan.............................. 48-12637

[52] U.S. Cl............................. 303/6 C; 200/82 D
[51] Int. Cl.²........................................... B60T 8/26
[58] Field of Search.......... 200/82 D, 153 A, 153 E, 200/153 L, 275; 303/6 C

[56] References Cited
UNITED STATES PATENTS

| | | | |
|---|---|---|---|
| 3,228,194 | 1/1966 | Blair....................... | 200/82 D UX |
| 3,597,009 | 8/1971 | Baldwin..................... | 303/6 C |
| 3,698,771 | 10/1972 | Keady....................... | 303/6 C |
| 3,733,106 | 5/1973 | Rike et al................. | 303/6 C |
| 3,739,119 | 6/1973 | Rike........................ | 200/82 P |
| 3,790,221 | 2/1974 | Fulmer...................... | 303/6 C |

*Primary Examiner*—Duane A. Reger
*Attorney, Agent, or Firm*—Oblon, Fisher, Spivak, McClelland & Maier

[57] ABSTRACT

A hydraulic braking system is provided with a hydraulic control warning device, the system including a piston which is adapted to be moved toward the right or left under the influence of a differential pressure associated with the hydraulic circuitry of the front wheel or rear wheel braking devices when one of the circuits is damaged, a rod made of insulating material whose lower end is fitted within a recessed portion of the piston and which is retained therewithin by means of a fulcrum, two electrically conductive springs which are disconnected from each other when they engage the upper end of the rod and which contact each other when the rod is disengaged therefrom due to movement of the piston, electrical terminals connected to the two springs, an electrical circuit connected to the terminals and including a power source, and a warning device.

5 Claims, 6 Drawing Figures

HYDRAULIC BRAKING SYSTEM

BACKGROUND OF THE INVENTION

1. Field of the Invention:

The present invention relates generally to hydraulic braking systems for vehicles, and more particularly to a hydraulic braking system in which an indicator warning lamp is provided for indicating a malfunctioning of the system.

2. Description of the Prior Art:

Various types of hydraulic damping systems are of course known, however, there is a substantial need for an improved hydraulic damping system having a hydraulic control warning device disposed therein which is able to detect and indicate a malfunctioning of the system.

SUMMARY OF THE INVENTION

Accordingly, it is an object of the present invention to provide an improved hydraulic braking system for vehicles.

Another object of the present invention is to provide an improved hydraulic braking system having a hydraulic control warning device which will indicate a malfunctioning of the system.

The foregoing objectives are achieved according to this invention through the provision of a hydraulic braking system having a hydraulic control warning device disposed therein, the system including a piston which is adpated to be moved toward the right or left under the influence of a differential pressure associated with the hydraulic circuitry of the front wheel or rear wheel braking devices when one of the circuits is damaged, a rod made of insulating material whose lower end is fitted within a recessed portion of the piston and which is retained therewithin by means of a fulcrum, two electrically conductive springs which are disconnected from each other when they engage the upper end of the rod and which contact each other when the rod is disengaged therefrom due to movement of the piston, electrical terminals connected to the two springs, an electrical circuit connected to the terminals and including a power source, and a warning device.

BRIEF DESCRIPTION OF THE DRAWINGS

Various other objects, features and attendant advantages of the present invention will become fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 1:
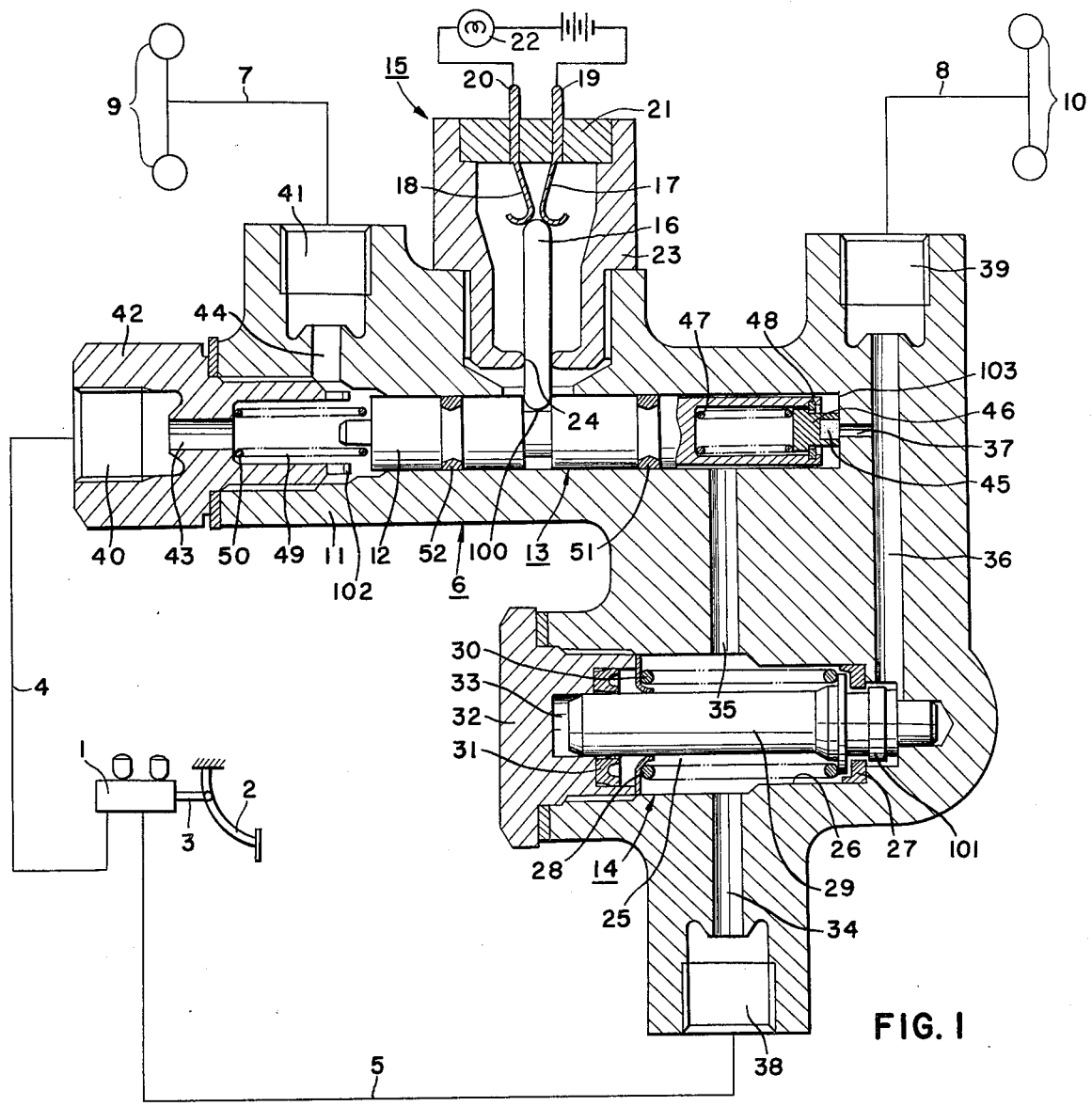
FIG. 1 is a schematic view, partly in section, of a hydraulic damping system constructed according to the present invention and showing its cooperative parts.
Figure 2:
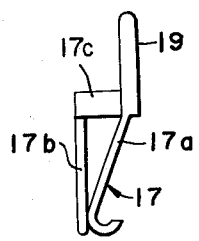
FIG. 2 is a front view of one of the spring members of the switch system associated with the warning device embodied within the system of the present invention.
Figure 3:
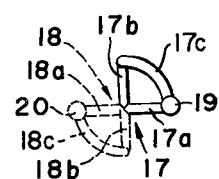
FIG. 3 is a plan view of the spring member shown in FIG. 2 shown in solid lines and in conjunction with the other spring member of the switch system, which is shown in dotted lines.

Referring now to the drawings, and more particularly to FIG. 1, thereof, the hydraulic braking system of the present invention is seen to include a dual fluid type master cylinder 1 which is connected to a brake pedal 2 by means of a push rod 3, conduits 4 and 5 serving to connect cylinder 1 with a hydraulic control warning device, generally indicated by the reference character 6. Conduits 7 and 8 similarly connect the hydraulic control warning device 6 with a front wheel braking device 9 and a rear wheel braking device 10, respectively. The hydraulic control warning device 6 in turn includes a bypass system generally indicated by the reference character 13 having a piston 12 which reciprocates within a body 11 under the influence of a differential pressure, a proportioning valve generally indicated by the reference character 14, and a switch system generally indicated by the reference character 15 which is interlocked with and operatively corresponds to the movement of the piston 12.

The switch system 15 consists of an electrical circuit comprising an elongate insulation rod 16 the dependent end of which is adapted to fit within a circumferentially recessed portion 100 of the piston 12 whereby the dependent lower end of rod 16 is moved toward the right or left in correspondence with the movement of the piston 12, electroconductive springs 17 and 18 associated with the upper end of rod 16 each of which has an end terminal 19 and 20 respectively which is embedded within a support member 21 made of insulating material, and an indicating lamp 22 electrically connected to the terminals 19 and 20. The rod 16 passes through an aperture 24 formed within the base of a housing 23 of the switch system, aperture 24 thereby serving as a fulcrum as the dependent end of rod 16 reciprocates back and forth in conjunction with piston 12.

As best seen in FIGS. 2, 3, 4 and 5, the springs 17 and 18 comprise portions 17a and 18a which are respectively connected to the terminals 19 and 20 and which are angled relative to the longitudinal axes of terminals 19 and 20, and spring portions 17b and 18b which are similarly angled within planes perpendicular to the planes within which are located spring portions 17a and 18a. Portions 17b and 18b being connected to the terminals 19 and 20 by arcuate support portions 17c and 18c, respectively, from which the terminals 19 and 20 extend in a direction substantially opposite to that of the spring portions 17a, 17b, 18a and 18b, such that the spring portions are inwardly urging to support the rod 16. The lower extremities of the spring portions 17a, 17b, 18a and 18b are curled and normally compressed together so as to make contact with each other and are adapted to be expanded by the upper end of rod 16 under normal conditions so as to break the contact and open the circuit. The curled portions of spring members 17 and 18 serve as cam members which permit rod 16 to smoothly make or break the contact therebetween and the associative circuit. Accordingly, the lower extremities of the spring parts 17a, 17b, 18a and 18b are in contact with the rod 16 whereby the springs 17 and 18 will be accurately connected and disconnected in accordance with the operative modes of the system. Preferably, each spring member 17, 18 is integrally formed, as shown best in FIG. 5, and is made of plate spring material. It is of course noted that the distance between the fulcrum point 24 and the upper end of the rod 16 which is in contact with the springs 17 and 18 is substantially greater than the distance between the fulcrum point 24 and the lower end of the rod 16 which is fitted within the small recessed portion 100 of the piston 12, and accordingly, a slight movement of the lower end of the rod 16 is amplified so as to result in a substantial movement at the upper end because of the noted lever ratio.

Still referring to FIG. 1, the proportioning valve 14 includes a chamber 25 within body 11 wherein a valve seat 27 is disposed within a bore 26 in liquid tight condition and is in contact with a shoulder, not numbered, of the body 11, a plunger 29 also being disposed within chamber 25 and having a flanged portion 101 which serves as a valve which is normally unseated with respect to seat 27 under the influence of coil spring 28. An annular retainer 30, which supports the other end of the spring 28, abuts the right end of a plug 32 as seen in FIG. 1, and an annular seal cup 31 is disposed within a recessed portion of plug 32 whereby leakage of the liquid from the chamber 25 to an atmospheric chamber 33, defined between plug 32 and the left end portion of plunger 29, is prevented. Passages 34, 35, 36 and 37 are respectively provided so as to interconnect chamber 25 with an inlet port 38 which receives brake hydraulic fluid from the master cylinder 1 by means of conduit 5, chamber 25 with bypass system 13, chamber 25 with an outlet port 39 which delivers fluid to rear wheel braking device 10, and conduit 36 with bypass system 13.

The bypass system 13 includes an inlet port 40 which is adapted to receive brake hydraulic fluid from the master cylinder 1 and which is disposed within plug 42, an outlet port 41 which delivers fluid to front wheel braking device 9, and passages 43 and 44 which connect the ports to system 13. A cylindrical bore, not numbered, is provided within the right end portion of piston 12 and a spring 47 is interposed between the end wall defining the bore and the left face of a support 46 disposed within the right end portion of the bore. The right end portion of member 46 abuts bore wall 103 of body 11 within which passage 37 is disposed and a valve 45 is provided within support member 46 so as to seal passage 37 when the piston 12 is moved toward the right against the biasing action of spring 47. A ring 48 is fitted within the annular wall portion of piston 12 defining the bore and is adapted to engage the enlarged head end part of member 46 which is substantially T-shaped in cross-section and in this manner, the piston 12 is able to withdraw the support 46 and the valve 45 away from bore wall 103 so as to open the passage 37 when the piston 12 is moved toward the left.

A spring 50 is similarly disposed within a chamber 49 within plug 42 and thereby interposed between the left end surface of the piston 12 and the end wall defining chamber 49, the spring forces of spring 50 and spring 47 being balanced so as to place the piston 12 at the position shown in the drawing under normal conditions whereby the rod 16 will force the springs 17 and 18 to separate and be disconnected from one another. It is of course noted that the right annular end portion 102 of the plug 42 may serve as a stopper means so as to limit the movement of the piston 12 toward the left, while the bore wall 103 of the body 11 likewise limits the movement of the piston 12 toward the right. Seal rings 51 and 52 are disposed upon the outer surface of the piston 12 at selected locations relative to passage 35 and chamber 49.

When the operation of the dual system master cylinder 1 is normal, hydraulic pressure is supplied through the conduit 4, the inlet port 40, the passages 43 and 44, the outlet port 41, and the conduit 7 to the front wheel braking device 9. The hydraulic pressure is of course also supplied through the conduit 5, the inlet port 38, the passage 34, the chamber 25, the valve 27, the passage 36, the outlet port 39, and the conduit 8 to the rear wheel braking device 10. The braking hydraulic pressure supplied through the noted passages to the front and rear wheel braking devices 9 and 10 is substantially the same until the pressure of the master cylinder increases to a predetermined value. When the pressure of the master cylinder increases to such predetermined value, the plunger 29 is moved toward the left against the biasing force of spring 28 due to the fact that the left end portion of plunger 29 is within the atmospheric chamber 33. Accordingly, valve 101 contacts valve seat 27 so as to terminate hydraulic pressure flow between the inlet port 38 and the outlet port 39.

When the pressure of the master cylinder increases further, the plunger 29 is moved toward the right so as to unseat the valve 101 from seat 27. Such mode of operation is cyclically repeated whereby the rate of hydraulic pressure increase at the outlet port 39 is substantially less than the rate of hydraulic pressure increase at the inlet port 38. The hydraulic pressure supplied to the inlet port 40 however is the same as the hydraulic pressure supplied from the chamber 25 through the passage 35, and consequently, as such pressures are supplied to both ends of the piston 12 the piston remains in the position illustrated.

Figure 6:
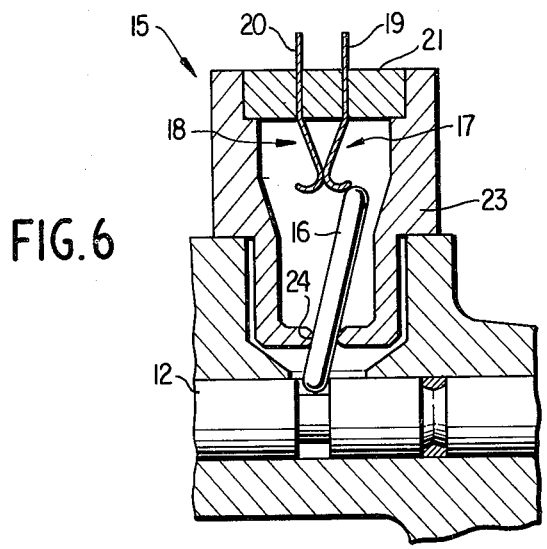
FIG. 6 is a view, partly in cross-section, of the spring members being in connecting relation.
Figure 4:
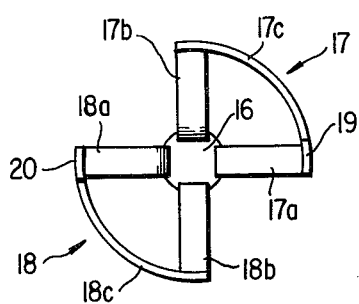
FIG. 4 is a plan view of the spring members shown in FIG. 1.
Figure 5:
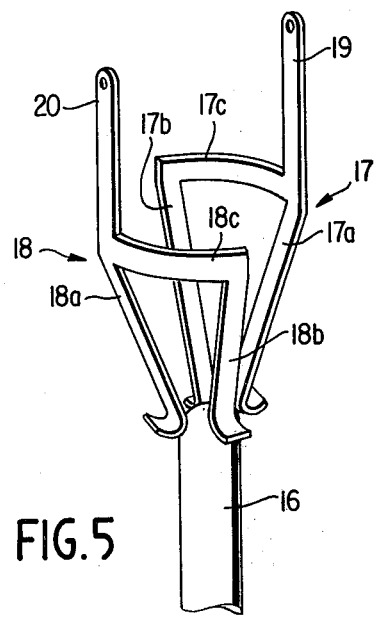
FIG. 5 is a perspective view of the spring members with the insulating rod member breaking the contact thereof.

If the conduit 7 connected to the front wheel braking device should become damaged, the pressure within the chamber 49 is decreased and the piston 12 is moved toward the left whereby the support 46 is also drawn toward the left through means of ring 48 so as to withdraw valve 45 from bore wall 103 and thereby open the passage 37. Accordingly, the hydraulic pressure of the passage 35 is able to be supplied through the passage 37 to the rear wheel braking device 10, such passageways forming a bypass circuit. In accordance with the movement of piston 12, the upper portion of rod 16 is moved toward the right about the fulcrum 24 whereby rod 16 will be located exteriorly of the spring 17, as shown in FIG. 6, and accordingly, the lower parts 17a, 17b, 18a, and 18b of the springs 17 and 18 will be connected so as to close the electrical circuit formed by the terminals 19 and 20, the power source and the lamp 22 whereby the latter will be lit so as to indicate the damage to the braking passage. The movement of the piston 12 toward the left is of course limited by means of the stopper 102, and it is of course further noted that the warning switch is able to be actuated by means of a small movement of the piston 12 due to the high lever ratio of the rod 16 as retained by the fulcrum 24.

Similarly, if the conduit 8 associated with the rear wheel braking device 10 is damaged and the hydraulic pressure within the passage 35 decreases, the piston 12 is moved toward the right whereby the rod 16 is similarly positioned exteriorly of spring 18 so as to permit the indicator lamp 22 to be lit. The movement of the piston 12 toward the right is of course limited by means of the wall 103.

As stated above, in accordance with the present invention, when the front wheel or rear wheel braking circuit is broken, the end of the rod 16 is moved a substantial amount in correspondence to a small movement of the piston 12 so as to provide an accurate warning of such condition through means of lamp 22, the piston 12 moving toward the right or left due to the influence of the differential pressure acting thereon. Accordingly, the movement of the piston 12 can be small and the quantity of the actuating hydraulic fluid and pressure can be small. The two springs connected to the terminals at the top of the rod are readily connected and disconnected due to the movement of the rod 16 and such connections are able to be accurately performed and controlled.

Obviously, many modifications and variations of the present invention are possible in light of the above teachings. It is to be understood, therefore, that within the scope of the appended claims the present invention may be practiced otherwise than as specifically described herein.

What is claimed as new and desired to be secured by Letters Patent of the United States is:

1. A hydraulic braking system for vehicles including means for generating hydraulic pressure, first and second wheel cylinders, first and second passages which connect said means for generating hydraulic pressure to said first and second wheel cylinders, the improvement comprising a hydraulic pressure loss warning device interposed between said first and second passages, said device comprising:
   a first housing having a bore;
   a piston adapted to be slidable within said bore which is fluidically connected to said first and second passages;
   a rod made of insulation material one end of which is connected to said piston and which is pivoted in response to the movement of said piston;
   automatically resettable switching means connected to the other end of said rod and which is in an open, non-warning position unde normal conditions, said switching means including two conductive springs having curled end portions which are biased apart and disconnected from each other by said rod under said normal conditions and which are permitted to be connected under pressure-loss conditions as a result of said pivotal movement of said rod;
   means for warning of the braking hydraulic pressure loss which is interconnected to said switching means; and
   fulcrum means for retaining said rod and about which said rod is adapted to be shifted, wherein the length between said one end of said rod and said fulcrum is shorter than the length between said other end of said rod and said fulcrum.

2. The hydraulic damping system according to claim 1, wherein said warning means comprises:
   terminals connected to each of said two springs and insulatingly separated from each other;
   an electrical circuit connecting said terminals to a power source; and
   a warning lamp disposed within said electrical circuit.

3. The hydraulic damping system according to claim 1, wherein said fulcrum means is disposed within the base portion of a second housing which in turn is disposed within said first housing.

4. The hydraulic damping system according to claim 1 which further includes a proportioning control valve comprising:
   an inlet port connected to said means for generating said hydraulic pressure and which is disposed within said passage;
   an outlet port connected to said second wheel cylinder; and
   means for controlling the rate of hydraulic pressure increase at said outlet port such that said increase is less than the rate of hydraulic pressure increase at said inlet port when the hydraulic pressure generated by said means for generating said hydraulic pressure reaches a predetermined value.

5. The hydraulic damping system according to claim 4 further comprising:
   a bypass passage which is closed under normal conditions and which is adapted to supply said inlet port pressure of said proportioning control valve to said second wheel cylinder; and
   valve means which is operationally connected to said piston to close said bypass passage under normal conditions;
   wherein said valve means is actuated to open said bypass passage in correspondence to a movement of said piston at the time of hydraulic pressure loss within the system connected to said first wheel cylinder.

* * * * *